US012742725B2

(12) United States Patent
Jho et al.

(10) Patent No.: US 12,742,725 B2
(45) Date of Patent: Sep. 22, 2026

(54) EVALUATING APPARATUS FOR THERMAL BOUNDARY CONDUCTANCE USING ACOUSTIC PHONON WAVES

(71) Applicant: GIST(Gwangju Institute of Science and Technology), Gwangju (KR)

(72) Inventors: Young Dahl Jho, Gwangju (KR); Sehyuk Lee, Gwangju (KR); Sang-Hyuk Park, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 148 days.

(21) Appl. No.: 18/451,672

(22) Filed: Aug. 17, 2023

(65) Prior Publication Data

US 2024/0159658 A1 May 16, 2024

(30) Foreign Application Priority Data

Nov. 15, 2022 (KR) ........................ 10-2022-0152604

(51) Int. Cl.
*G01N 21/25* (2006.01)

(52) U.S. Cl.
CPC . *G01N 21/255* (2013.01); *G01N 2201/06113* (2013.01); *G01N 2201/066* (2013.01); *G01N 2201/126* (2013.01)

(58) Field of Classification Search
CPC ....... G01N 21/255; G01N 2201/06113; G01N 2201/066; G01N 2201/126; G01N 2021/1706; G01N 21/1702; G01N 25/18; G01N 21/171; G01N 21/39; G01N 21/636; G01N 25/20; G01N 29/075; G01N 29/2418; G01N 29/44; G01N 2291/012; G01N 2291/02881; G01N 2291/051; G01N 2291/2697
See application file for complete search history.

(56) References Cited

U.S. PATENT DOCUMENTS

| | | | | |
|---|---|---|---|---|
| 2006/0044641 | A1* | 3/2006 | Alles | G01N 21/63 359/328 |
| 2017/0205377 | A1* | 7/2017 | Garnett | G01N 21/8422 |

OTHER PUBLICATIONS

Sang-Hyuk Park et al.; "Annealing-based manipulation of thermal phonon transport from light-emitting diodes to graphene"; Journal of Applied Physics 130, 244303; Dec. 28, 2021; pp. 1-11. https://doi.org/10.1063/5.0069466 (Year: 2021).*

(Continued)

*Primary Examiner* — Tarifur R Chowdhury
*Assistant Examiner* — Akbar H. Rizvi
(74) *Attorney, Agent, or Firm* — Studebaker Brackett PLLC

(57) ABSTRACT

The present disclosure relates to an apparatus for evaluating thermal conductance of an interface on the basis of how much the phases of acoustic phonons, which are produced in a semiconductor, change on a semiconductor interface. The apparatus for evaluating thermal conductance of a semiconductor interface according to an embodiment of the present disclosure includes: a spectrometer exciting acoustic phonons in a semiconductor by irradiating a laser beam to the semiconductor; and a processor evaluating thermal conductance of an interface of the semiconductor in accordance with a phase difference of an ascending acoustic phonon propagating toward the interface and reflecting from the interface and a descending acoustic phonon propagating in an opposite direction to the interface.

9 Claims, 10 Drawing Sheets

(56) References Cited

OTHER PUBLICATIONS

Sang-Hyuk Park et al.; "Annealing-based manipulation of thermal phonon transport from light-emitting diodes to graphene"; Journal of Applied Physics 130, 244303; Dec. 27, 2021; pp. 1-11.

* cited by examiner

FIG. 9

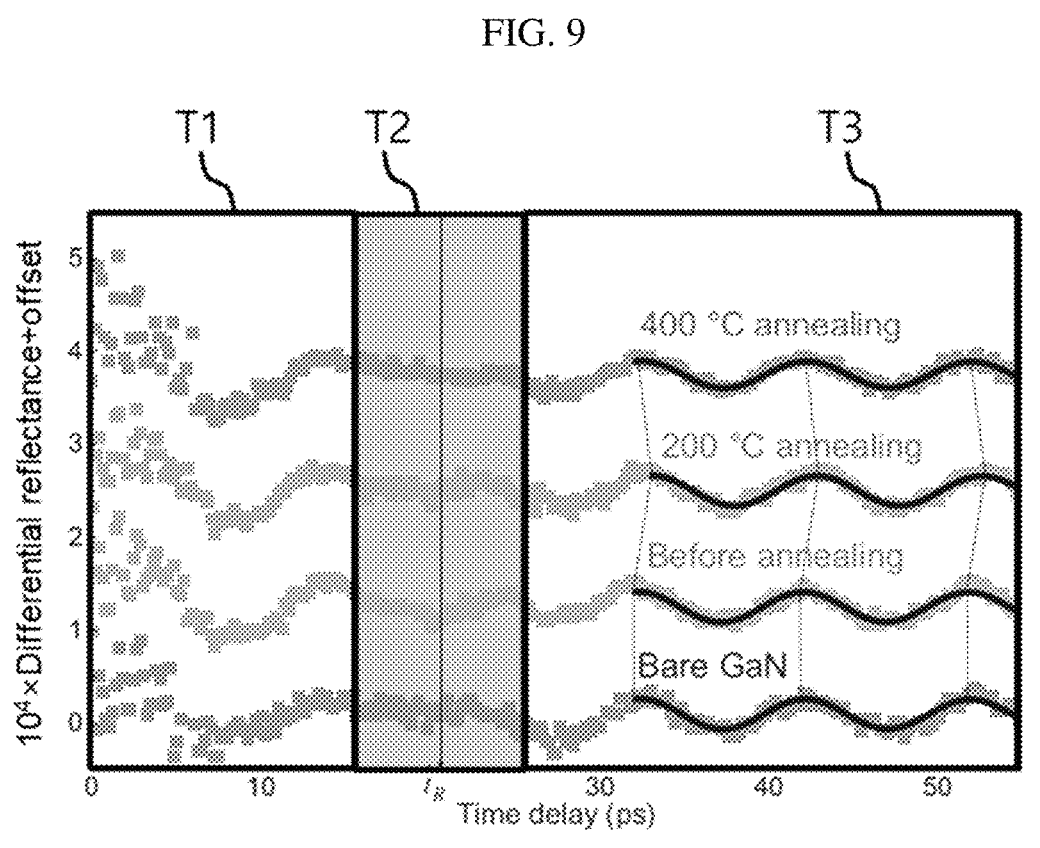

T1
T2
T3
400 °C annealing
200 °C annealing
Before annealing
Bare GaN
$10^4$×Differential reflectance+offset
0
1
2
3
4
5
0
10
30
40
50
Time delay (ps)

EVALUATING APPARATUS FOR THERMAL BOUNDARY CONDUCTANCE USING ACOUSTIC PHONON WAVES

CROSS REFERENCE TO RELATED APPLICATION

The present application claims priority to Korean Patent Application No. 10-2022-0152604, filed Nov. 15, 2022, the entire contents of which is incorporated herein for all purposes by this reference.

BACKGROUND OF THE INVENTION

Field of the Invention

The present disclosure relates to an apparatus for evaluating thermal boundary conductance on the basis of how much the phases of acoustic phonon waves, which are produced in a semiconductor, change on a semiconductor interface.

Description of the Related Art

As the size of semiconductor devices is gradually decreased and the degree of integration is greatly increased, various problems are generated due to heat generation in devices. Since heat generation is a major factor that saturates the electron drift velocity and reduces the quantum efficiency of semiconductor devices, improving the heat dissipation performance of semiconductor devices is an important issue. Heat in solids is usually transferred by conduction among three types of heat transfer mechanisms: conduction, convection and radiation. Accordingly, the thermal conductance between the materials of semiconductors or between metal and semiconductor, referred to as thermal boundary conductance or interfacial thermal conductance, should be high to improve the heat dissipation performance of the relevant devices and systems. In particular, a semiconductor chip formed by stacking unit semiconductor elements must have high thermal boundary conductance at the interface between different materials. Likewise, when bonding a heat dissipation material to a semiconductor chip, the thermal boundary conductance must be high at the interface between the semiconductor and the heat dissipation material.

To this end, the semiconductor manufacturing industry needs thermal boundary conductance measurement technology. Using the interface between graphene and a semiconductor diode as an example of an indicator for this, the thermal boundary conductance measurement technology used in the heat dissipation optimization process following annealing treatment is taken as an example to definitize the ideas, theories, and various equipment required for the invention. The background of the use of this indicator is that a technology for improving heat dissipation performance by depositing graphene with high in-plane thermal conductivity on the surface of a semiconductor as a heat dissipation material has been previously proposed. Contrary to this, since the direction in which heat is transferred at the interface is perpendicular to the direction of in-plane thermal conduction in graphene, the improvement of the thermal boundary conductance determines the overall heat dissipation efficiency. These issues are physically related to atomic bonding at the interface, which is further influenced by thermal expansion coefficient. For example, graphene has a negative thermal expansion coefficient in the thermal annealing process, which is deformed in the out-of-plane direction from the conventional semiconductor surface, thus changing the thermal boundary conductance.

In this way, evaluating apparatus for thermal boundary conductance in this indicator system serves as a testimony of the present invention. This evaluating apparatus for thermal boundary conductance then can be used to inspect various heat treatments and is fed back into the chip design process to have better heat dissipation efficiency. Accordingly, it is required to figure out an optimal annealing temperature that can uniformly and strongly bond graphene to a semiconductor surface of the device, that is, finding an optimal annealing temperature that maximizes the thermal boundary conductance, and to this end, there is a need for a method that can accurately evaluate the thermal boundary conductance of a semiconductor.

SUMMARY OF THE INVENTION

An objective of the present disclosure is to evaluate the thermal boundary conductance at a semiconductor interface on the basis of a phase difference of time-resolved acoustic phonon oscillation signals that are shown when optically measuring acoustic phonons, which act as heat carriers when heat is generated in the semiconductor, using an acoustic spectrometer.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

In order to achieve the objectives described above, an apparatus for evaluating thermal boundary conductance according to an embodiment of the present disclosure includes: an acoustic spectrometer exciting and probing acoustic phonons in a semiconductor by irradiating a laser beam to the semiconductor; and a processor evaluating thermal boundary conductance of the semiconductor in accordance with a phase difference of an ascending acoustic phonon propagating toward the interface and reflecting from the interface and a descending acoustic phonon propagating in an opposite direction to the interface.

In an embodiment, the ascending and descending acoustic phonons propagate in opposite directions to each other from a heat source of quantum well in the semiconductor.

In an embodiment, the ascending and descending acoustic phonons propagate perpendicularly to the interface.

In an embodiment, the acoustic spectrometer excites the ascending and descending acoustic phonons by irradiating a pump beam to the semiconductor and receives interfered probe beams reflected from the ascending and descending acoustic phonons, respectively, by irradiating a probe beam to the semiconductor; and the processor figures out a magnitude difference between the ascending and descending acoustic phonons on the basis of the phase change of time-resolved acoustic phonon oscillation signals between before and after acoustic reflection at the interface and evaluates corresponding thermal boundary conductance.

In an embodiment, the acoustic spectrometer receives the interfered probe beams while adjusting an optical path difference of the pump beam and the probe beam.

In an embodiment, the processor figures out the phase difference on the basis of reflectivity of a probe beam for each time delay according to the optical path difference.

In an embodiment, the processor figures out an acoustic phonon amplitude ratio corresponding to the phase difference in accordance with the following [Equation 1] and extracts the thermal boundary conductance from the acoustic phonon amplitude ratio, $$\phi_{C/T} = \tan^{-1}\left(\frac{\sin(2nk_{probe}(z_C - z_T))}{\cos(2nk_{probe}(z_C - z_T)) - \frac{\eta_T}{\eta_C}}\right) \quad \text{[Equation 1]}$$

(where $\phi_{C/T}$ is the phase difference, n is a refractive index of medium at laser wavelength, $k_{probe}$ is a wavenumber of the laser beam, $z_C$ is the position of the ascending acoustic phonon, $z_T$ is the position of the descending acoustic phonon, $\eta_C$ is the amplitude of the ascending acoustic phonon after reflection at the interface, $\eta_T$ is the amplitude of the descending acoustic phonon, and $$\frac{\eta_T}{\eta_C}$$

is the acoustic phonon amplitude ratio).

In an embodiment, the processor evaluates the thermal boundary conductance to be associated with inverse amplitude ratio of $$\left(\frac{\eta_T}{\eta_C}\right)^{-1}, \text{ as } \left[1 - \left(\frac{\eta_T}{\eta_C}\right)^{-1}\right]^2.$$

According to the present disclosure, it is possible to perform thermal annealing treatment that maximizes the heat dissipation performance of a semiconductor by evaluating the thermal boundary conductance of a semiconductor interface on the basis of the phase difference of acoustic phonons produced in the semiconductor.

In detail, since an optimal heat treatment condition for depositing a thermally conductive material and heat dissipation characteristic evaluation is possible by evaluating thermal boundary conductance regardless of the type or properties of materials at interfaces between a semiconductor and a heat dissipation material and between semiconductors, and the production process of a semiconductor, there is an effect that it is possible to maximize heat dissipation performance of a semiconductor.

Detailed effects of the present disclosure in addition to the above effects will be described with the following detailed description for accomplishing the present disclosure.

BRIEF DESCRIPTION OF THE DRAWINGS

FIG. 9 is a diagram showing the time-resolved acoustic phonon oscillations, which is referred to as differential reflectance in the figure, according to a time delay at each annealing temperature.

DETAILED DESCRIPTION OF THE INVENTION

Figure 1:
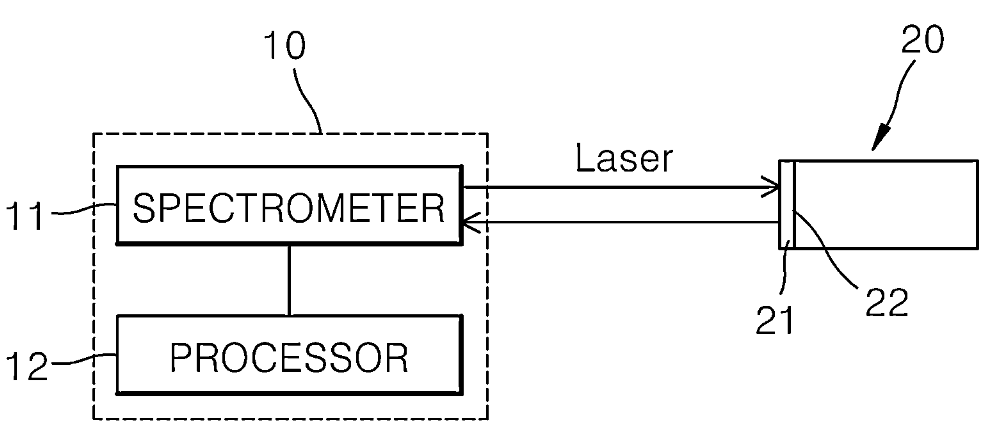
FIG. 1 is a diagram showing an embodiment of an apparatus for evaluating thermal boundary conductance.

The objects, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present invention will be described with reference to accompanying drawings. The same reference numerals are used to indicate the same or similar components in the drawings.

Although terms “ascending”, “descending”, etc. are used to describe various components in the specification, it should be noted that these components are not limited by the terms. These terms are used to discriminate one component from another component and it is apparent that a ascending component may be a descending component unless specifically stated otherwise.

Further, when a certain configuration is disposed “over (or under)” or “on (or beneath)” of a component in the specification, it may mean not only that the certain configuration is disposed on the top (or bottom) of the component, but that another configuration may be interposed between the component and the certain configuration disposed on (or beneath) the component.

Further, when a certain component is “connected”, “coupled”, or “jointed” to another component in the specification, it should be understood that the components may be directly connected or jointed to each other, but another component may be “interposed” between the components or the components may be “connected”, “coupled”, or “jointed” through another component.

Further, singular forms that are used in this specification are intended to include plural forms unless the context clearly indicates otherwise. In the specification, terms “configured”, “include”, or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

The present disclosure relates to an apparatus for evaluating thermal boundary conductance of an interface on the basis of how much the phases of acoustic phonon oscillations, which are produced in an acoustic spectrometer acting semiconductor, change on a semiconductor interface. Hereafter, an apparatus for evaluating thermal conductance of a semiconductor interface according to an embodiment of the present disclosure is described in detail with reference to FIGS. 1 to 10.

FIG. 1 is a diagram showing an embodiment of an apparatus for evaluating thermal boundary conductance, composed of an acoustic spectrometer, processor, and laser.

Figure 2A:
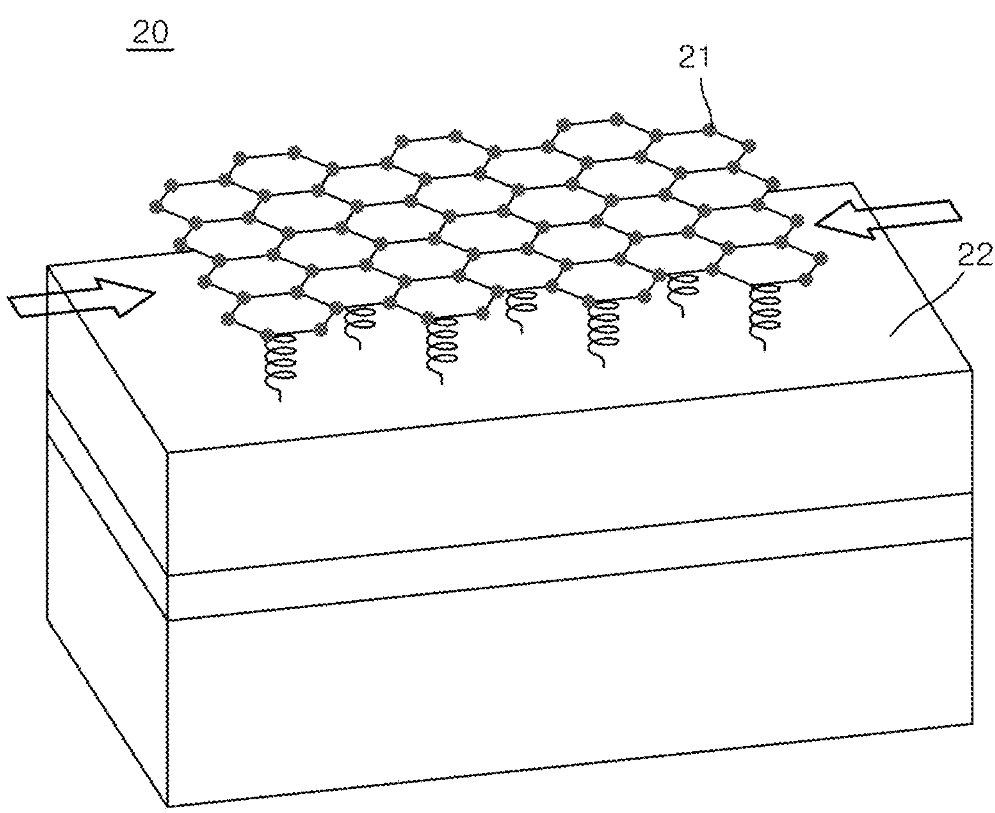
FIGS. 2A and 2B are diagrams exemplarily showing the semiconductor structure of a GaN-based LED in which a heat generation layer is a quantum well of around nanometers.
Figure 2B:
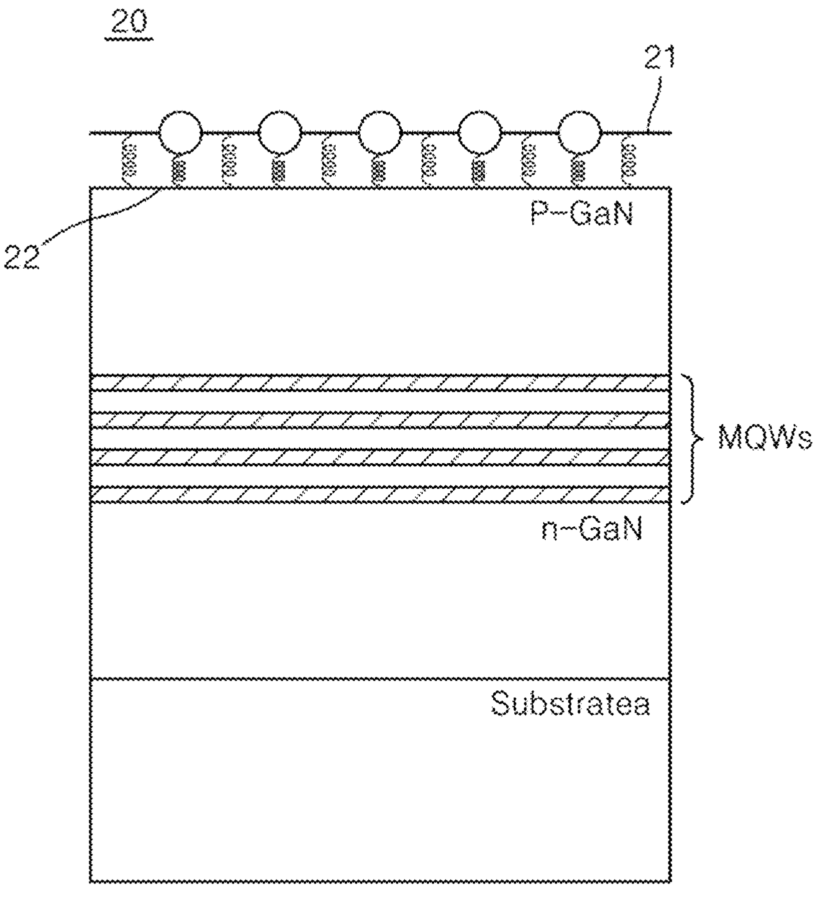
Figure 3:
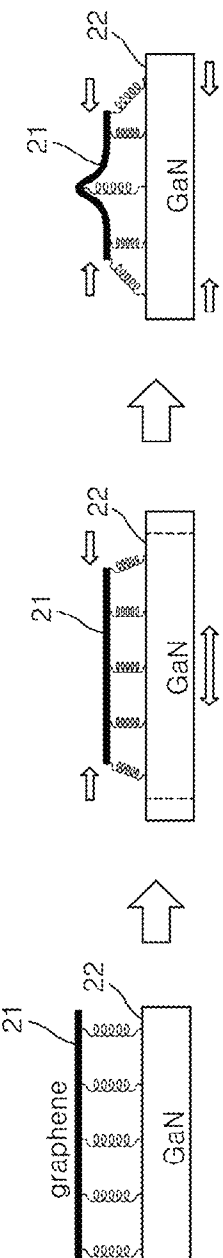
FIG. 3 is a diagram showing that graphene deposited on a semiconductor surface deforms during annealing treatments.

FIGS. 2A and 2B are diagrams exemplarily showing the semiconductor structure of a GaN-based LED in which a heat generation layer is a quantum well of around nanometers and FIG. 3 is a diagram showing that graphene deposited on a semiconductor surface deforms during annealing treatments.

Figure 4:
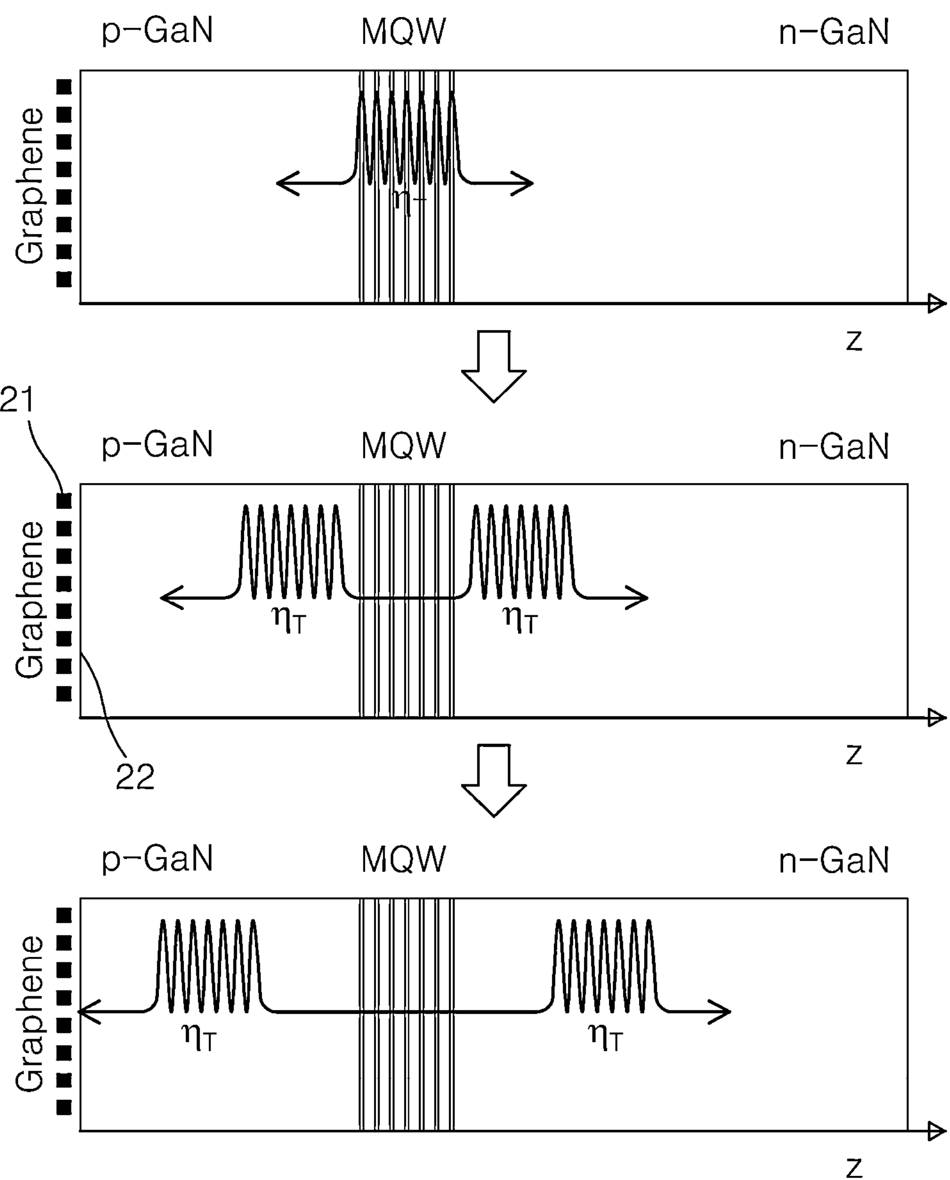
FIG. 4 is a diagram showing a propagation process of acoustic phonons that function as heat carriers in a semiconductor.
Figure 5:
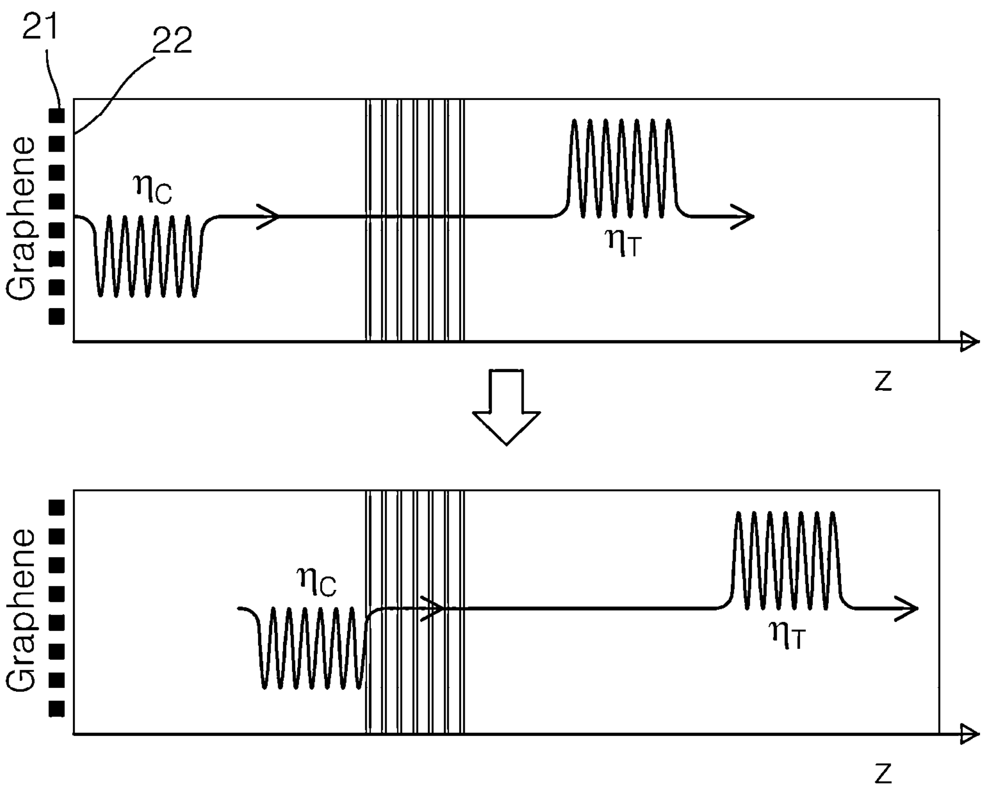
FIG. 5 is a diagram showing the propagation process after the ascending acoustic phonon is reflected at the semiconductor interface to have the opposite strain and the descending acoustic phonon propagates without reflection.

FIG. 4 is a diagram showing a propagation process of acoustic phonons that function as heat carriers in a semiconductor and FIG. 5 is a diagram showing the propagation process after the ascending acoustic phonon is reflected at the semiconductor interface to have the opposite strain and the descending acoustic phonon propagates without reflection.

Figure 6:
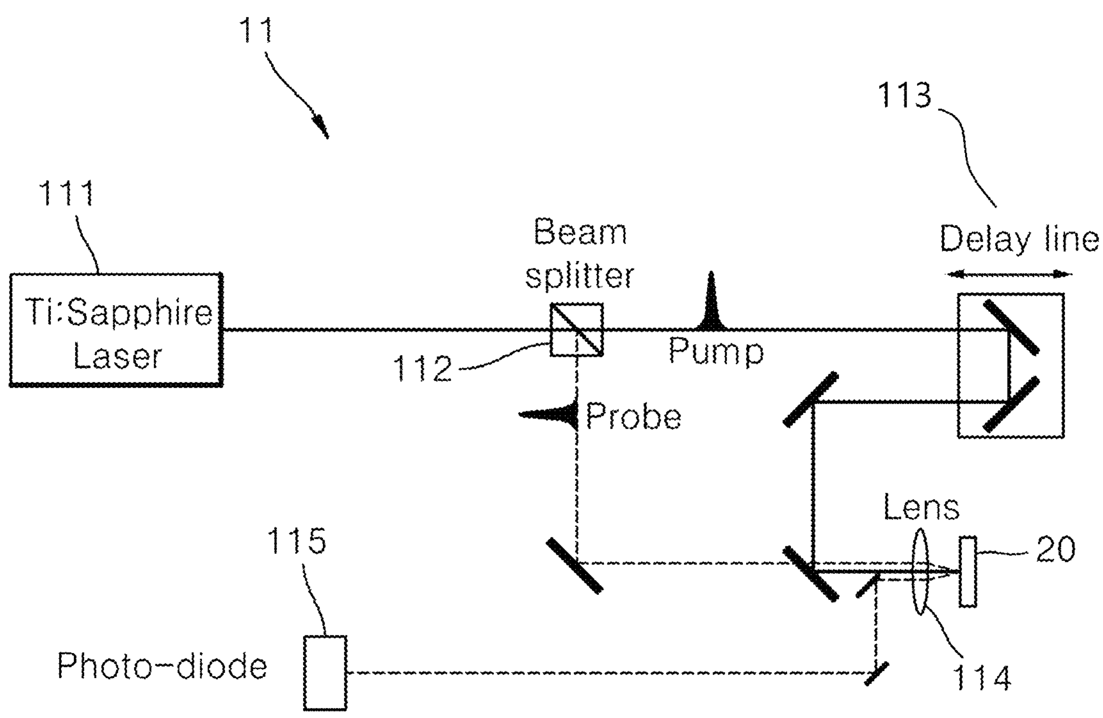
FIG. 6 is a diagram showing an example of an acoustic spectrometer, abbreviated as spectrometer, to measure time-resolved acoustic phonon oscillations of the evaluation apparatus of the present disclosure.
Figure 7:
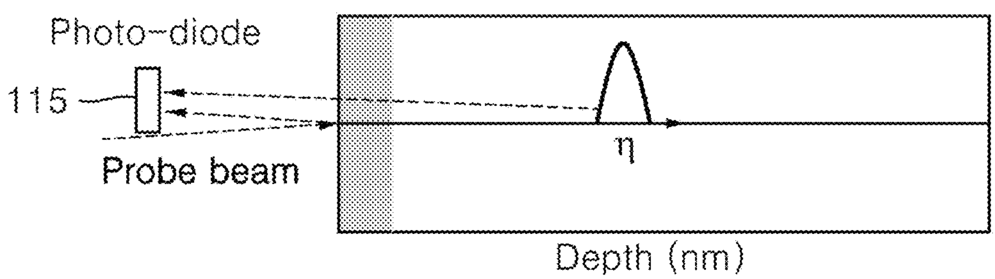
FIG. 7 is a diagram showing that a photo-diode of an acoustic spectrometer receives probe beams reflecting from a semiconductor surface and from an acoustic phonon.

FIG. 6 is a diagram showing an example of an acoustic spectrometer to measure time-resolved acoustic phonon oscillations of the evaluation apparatus of the present disclosure and FIG. 7 is a diagram showing that a photo-diode of the acoustic spectrometer receives probe beams reflecting from a semiconductor surface and from an acoustic phonon.

Figure 8:
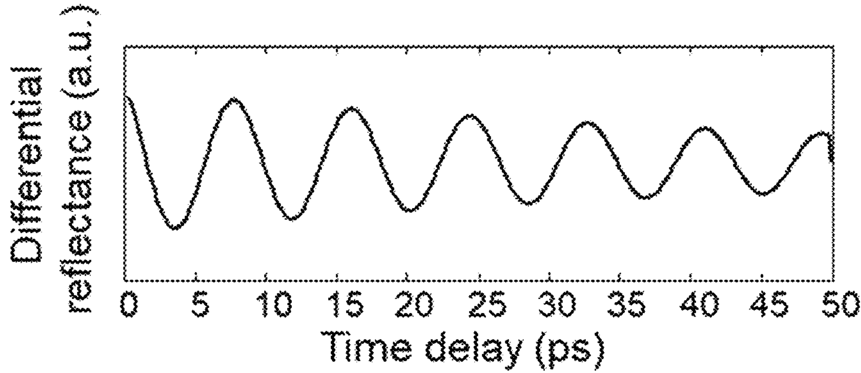
FIG. 8 is a diagram showing the time-resolved acoustic phonon oscillations, which is referred to as differential reflectance in the figure, due to the reflectivity changes of probe light from acoustic phonons with a time delay.

FIG. 8 is a diagram showing the time-resolved acoustic phonon oscillations due to the reflectivity changes of probe light from acoustic phonons with a time delay.

FIG. 9 is a diagram showing the time-resolved acoustic phonon oscillations, recorded in the processor as a function of the time delay at each annealing temperature.

Figure 10:
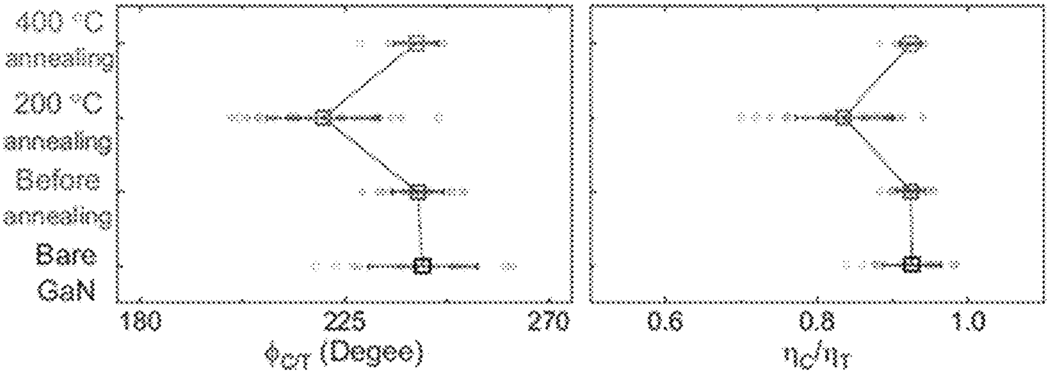
FIG. 10 is a diagram showing a phase difference of the time-resolved acoustic phonon oscillations and a corresponding acoustic phonon amplitude ratio.

FIG. 10 is a diagram showing (left panel) a phase shift of the time-resolved acoustic phonon oscillations between before and after reflection and (right panel) a corresponding acoustic phonon amplitude ratio.

Referring to FIG. 1, an apparatus for evaluating thermal conductance of a semiconductor interface (hereafter, an evaluation apparatus 1) according to an embodiment of the present disclosure includes a laser, an acoustic spectrometer (abbreviated as spectrometer 11), and a processor 12. However, the evaluation method shown in FIG. 1 is based on an embodiment, the components of the present disclosure are not limited to the embodiment shown in FIG. 1, and if necessary, some components may be added, changed, or removed.

Since the present disclosure is an apparatus for evaluating thermal conductance of a semiconductor interface 22, a semiconductor to be described below includes the interface 22. In detail, the semiconductor 20 may have a structure in which a substance (e.g., graphene 21) for heat conduction through the interface 22 is combined.

The semiconductor 20 may be a semiconductor for devices such as a transistor, a diode, and an LED or may be a semiconductor for an integrated circuit (IC) such as a memory semiconductor and a system semiconductor, and may be made of a single element (e.g., silicon (Si) or germanium (Ge)) or may be made of a compound (e.g., GaAs, GaP, GaN, InSb, InAs, and ZnS).

Referring to FIGS. 2A and 2B as an example, the semiconductor 20 in the present disclosure may have a structure in which n type GaN (n-GaN), a quantum well (QW), and p type GaN (p-GaN) are sequentially stacked on a substrate as an LED. Further, the semiconductor 20 may further include graphene 21 forming an interface 22 by atomic coupling with the p-GaN.

The graphene 21, or any other heat conduction materials, couples with GaN, or any other semiconductors, through annealing in the common process of manufacturing semiconductors, but there is a problem that when annealing temperature is not appropriate, the graphene 21 deforms and the thermal boundary conductance at the interface 22 decreases.

In detail, referring to FIG. 3, the graphene 21 and the GaN may be weakly coupled by van Der Waals force before annealing treatment. When annealing treatment is started, the coupling force between the graphene 21 and the GaN and deformation of the graphene 21 and the GaN are induced, that is, the graphene 21 contracts because it has a negative thermal expansion coefficient, but the GaN may expand.

During the annealing treatment, the ambient temperature rises to a certain value for a certain period of time, and then the temperature decreases to room temperature. But there is a problem that both the lattice constants and thermal expansion coefficients don't match between materials at the interface, deforming the graphene 21 both in-plane and out-of-plane directions, so thermal conductivity of the interface 22 may not be sufficiently secured.

The present disclosure is to accurately evaluate the thermal boundary conductance of a semiconductor interface using acoustic spectrometer in order to determine an optimal annealing temperature that can prevent the problem described above, and operation of the present disclosure is described in detail hereafter. Meanwhile, only a method of evaluating thermal boundary conductance is described below, but it is apparent that the present disclosure can be applied to figure out a thermal boundary conductance attenuation position at high-density heterogeneous semiconductor interfaces or to improve thermal boundary conductance under each heat dissipation sheet bonding condition.

Referring to FIG. 1 again, the spectrometer 11 whose components are further detailed in FIG. 6, can excite acoustic phonons in the semiconductor by irradiating a laser beam to the semiconductor 20.

Phonons, representing quantized vibrations of the crystal lattice, can be classified into optical phonons and acoustic phonons, and are major heat carriers during operation of semiconductor devices. Since optical phonons are negligibly slow, the thermal conductivity of the semiconductor interface 22 can be evaluated using only acoustic phonons that substantially function as heat carriers in the present invention. An acoustic phonon can be excited by temporal atomic deformation, that is, strain, which is generated in an active layer of the semiconductor 20, when a laser beam is irradiated to the semiconductor 20. In this case, an example of the active layer may be a quantum well, in detail, a multiple quantum well (MQW).

Referring to FIGS. 2A, 2B, and 4, when a laser beam delivered by the spectrometer 11 reaches a multiple quantum well, temporal atomic deformation may be generated at the multiple quantum well. The acoustic phonon can be simultaneously excited by deformation of the multiple quantum well and can be divided into halves having the same amplitude and propagated in the opposite directions from the multiple quantum well therebetween. In other words, an acoustic phonon generated at the multiple quantum well can propagate symmetrically with the same magnitude from the multiple quantum well therebetween.

In this case, the acoustic phonon can propagate in a direction (±z) perpendicular to the interface 22, and to this end, as shown in FIG. 1, the spectrometer 11 can irradiate a laser beam to the semiconductor 20 in a direction perpendicular to the interface 22.

In detail, as shown in FIGS. 2A and 2B, when a multiple quantum well is formed parallel with the interface 22 and a laser beam travels perpendicularly into the multiple quantum well, an acoustic phonon wave can be produced with a wavelength depending on the structure of the multiple quantum well. In this case, as shown in FIG. 4, the acoustic phonon produced at the multiple quantum well can be classified into an ascending tensile acoustic phonon $\eta_T$ propagating toward the interface and a descending tensile acoustic phonon $\eta_T$ propagating away from the interface (hereafter, an opposite-to-interface direction).

Referring to FIG. 5, the ascending acoustic phonon $\eta_T$ propagating toward the interface is partially transmitted to graphene, but the rest is partially reflected from the interface 22 and propagates in the opposite-to-interface direction. In this way, the ascending acoustic phonon has compressive strain polarity, denoted by $\eta_c$, after reflection from the interface 22, and the amplitude can be attenuated. In this case, the attenuation ratio of $\eta_c$ depends on the thermal boundary conductance of the interface 22 and the processor 12 can evaluate the thermal conductance of the interface 22 by figuring out the attenuated amplitude by analyzing the amplitude difference of the ascending and descending acoustic phonons ($\eta_c$ and $\eta_T$).

The processor 12 can evaluate the thermal boundary conductance of the interface 22 in accordance with the phase difference of the time-resolved acoustic oscillations between before and after reflection at the interface, thus extracting the ratio between $\eta_c$ and $\eta_T$.

In order to collect a signal showing the phase difference of the ascending and descending acoustic phonons ($\eta_c$ and $\eta_T$), the acoustic spectrometer 11 may be a pump-probe spectroscope.

In detail, referring to FIG. 6, the spectrometer 11 may include a Ti:Sapphire laser 111, a beam splitter 112, a delay line 113, a lens 114, and a photo-diode 115. However, as for the spectrometer 11 shown in FIG. 6, only necessary components of a pump-probe spectroscope that is required for operation to be described below are shown, so, if necessary, the spectrometer 11 may further include a harmonic generator, a chopper, a lock-in amplifier, a half-wave plate, a polarizer, etc.

Meanwhile, a series of optical pulses from the Ti:Sapphire laser 111 are classified into a pump beam for exciting an acoustic phonon and a probe beam for measuring an acoustic phonon oscillations.

The pump beam from spectrometer 11 can generate ascending and descending acoustic phonons ($\eta_c$ and $\eta_T$) due to heat generation of the semiconductor 20 by selectively irradiating a pump beam to the quantum well of semiconductor 20 and can receive interfered probe beams (hereafter, also referred to as an interference signal) reflected from the ascending and descending acoustic phonons ($\eta_c$ and $\eta_T$) by irradiating a probe beam to the semiconductor 20.

Referring to FIG. 6 again, the laser 111, for example, a Ti:Sapphire laser can output a laser beam and the laser beam can be separated into a pump beam and a probe beam by the beam splitter 112. The pump beam and the probe beam are both irradiated to the semiconductor 20 and have an optical path difference, that is, a time difference by the delay line 113, so an acoustic phonon excited by the pump beam can reflect the probe beam. The probe beam reflected by the acoustic phonon can be received to the photo-diode 115 in a time-resolved manner.

The operation of receiving a probe beam is briefly described with reference to FIG. 7. When a pump beam is irradiated to the semiconductor 20, an acoustic phonon $\eta$ is excited and propagated in the semiconductor 20, and when a probe beam having a time difference from the pump beam is irradiated to the semiconductor 20, the probe beam can be reflected from the acoustic phonon $\eta$ and the surface of the semiconductor 20 and can be received to the photo-diode 115, to form a time-varying Fabry-Perot interferometer.

In this case, the probe beam reflecting from the surface of the semiconductor 20 is uniform regardless of whether an acoustic phonon $\eta$ is produced and propagated, so the processor 12 can analyze the probe beam reflecting from the acoustic phonon by setting a reference signal on the basis of the fact.

As shown in FIG. 5, when ascending and descending acoustic phonons ($\eta_c$ and $\eta_T$) are excited and propagated, the processor 12 compares interfered probe beams reflected from the ascending and descending acoustic phonons ($\eta_c$ and $\eta_T$) with the reference signal (the probe beam reflecting from the surface of the semiconductor 20), thereby being able to figure out the phase difference between before (when the probe beam is reflected only by $\eta_T$) and after reflection (when the probe beam is reflected both by $\eta_c$ and $\eta_T$) and evaluate the inverse amplitude ratio of $$\left(\frac{\eta_T}{\eta_C}\right)^{-1}$$

then, thermal boundary conductance.

In this case, in order to obtain the phonon-induced Fabry-Perot interference signal in a sine waveform that can be analyzed, the spectrometer 11 can receive the probe beams while adjusting the optical path difference of the pump beam and the probe beams. In detail, referring to FIG. 6, the spectrometer 11 can adjust an optical path difference by moving the delay line 113 and can receive an interference signal that changes in accordance with adjustment of the optical path difference.

In an example, the processor 12 can figure out a phase difference on the basis of the reflectivity of a probe beam for each time delay according to the optical path difference. In other words, reflectivity of a probe beam may be used as an example of the interference signal.

Referring to FIG. 8, a time delay may be generated between a pump beam and a probe beam due to an optical path difference, and, as the time delay increases, reflectivity $\Delta R/R$ may be shown in an attenuating sine waveform. In this case, the reflectivity $\Delta R/R$ may be defined as a variation $\Delta R$ of reflectance of interfered probe beams reflected from ascending and descending acoustic phonons ($\eta_c$ and $\eta_T$) to the reflectance R of the probe beam reflecting from the semiconductor 20 without acoustic phonons.

The processor 12 can figure out the phase difference before and after the acoustic reflection of the ascending acoustic phonons (converting $\eta_T$ into $\eta_C$) on the basis of the reflectivity ΔR/R. In detail, the reflectivity ΔR/R may have the relationship in the following [Equation 1].

$$\frac{\Delta R}{R} \sim \sin(2nk_{probe}v_{AC}t + \phi_0 + \phi_{C/T}) \quad \text{[Equation 1]}$$

(where n is the refractive index of medium at a probe beam wavelength, $k_{probe}$ is a wavenumber of a probe beam, t is a time delay, $\phi_0$ is the phase at the production position of an acoustic phonon, and $\phi_{C/T}$ is the phase difference between before and after the acoustic reflection of the ascending acoustic phonons.

In this case, since parameters excluding the $\phi_{C/T}$ are preset values, the processor 12 can figure out the phase difference $\phi_{C/T}$ on the basis of the reflectivity ΔR/R. Next, the processor 12 can evaluate the thermal conductance of the interface 22 in accordance with the phase difference $\phi_{C/T}$.

In an embodiment, the processor 12 can evaluate thermal boundary conductance to be extracted from a phase difference $\phi_{C/T}$. As described above, since the strain-inverted acoustic phonon $\eta_c$ is formed after the acoustic reflection from the interface 22, the amplitude can be attenuated, and in this case, the amplitude attenuation amount of $\eta_c$ from its original value of $\eta_T$ can be used to deduce the thermal boundary conductance that is associated with $$\left[1 - \left(\frac{\eta_T}{\eta_C}\right)^{-1}\right]^2.$$

Meanwhile, a phase difference can be correlated to the amplitude attenuation amount, $$\frac{\eta_T}{\eta_C},$$

and accordingly, the processor 12 can evaluate thermal boundary conductance in accordance with a phase difference.

In this case, thermal boundary conductance corresponding to a phase difference may be stored in advance in a memory of the processor (not shown) and the processor 12 may evaluate the thermal conductance of the interface 22 as a value corresponding to a phase difference.

Further, the processor 12 may figure out an amplitude ratio $$\frac{\eta_T}{\eta_C},$$

corresponding to a phase difference, and subsequently evaluate the thermal boundary conductance to be associated with the inverse amplitude ratio. In this case, the amplitude ratio $$\frac{\eta_T}{\eta_C}$$

may be defined as the amplitude of the descending acoustic phonon $\eta_T$ to the amplitude of the ascending acoustic phonon $\eta_c$ reflecting with inverted strain sign from the interface 22.

In detail, a phase difference and an amplitude ratio $$\frac{\eta_T}{\eta_C}$$

may have the relationship in the following [Equation 2].

$$\phi_{C/T} = \tan^{-1}\left(\frac{\sin(2nk_{probe}(z_C - z_T))}{\cos(2nk_{probe}(z_C - z_T)) - \frac{\eta_T}{\eta_C}}\right) \quad \text{[Equation 2]}$$

(where $z_C$ is the position of the ascending acoustic phonon $\eta_c$ after reflection, $z_T$ is the position of the descending acoustic phonon $\eta_T$, and $$\frac{\eta_T}{\eta_C}$$

is the amplitude ratio.

In this case, the phase difference $\phi_{C/T}$ is determined by nominally preset values except $$\frac{\eta_T}{\eta_C}.$$

Eq. 2 assigns $\phi_{C/T}$ value to be null before acoustic reflection from the surface of the ascending wave since $$\frac{\eta_T}{\eta_C}$$

converges to infinity without compressive strain component of $\eta_C$; after reflection, however, the polarity-inverted $\eta_C$ component appears, rendering $\phi_{C/T}$ non-trivial. In this manner, the processor 12 can figure out the amplitude ratio $$\frac{\eta_T}{\eta_C}$$

on the basis of the phase difference $\phi_{C/T}$ between before and after the reflection of the ascending acoustic phonon wave. Next, the processor 12 can evaluate the thermal conductance of the interface 22 in accordance with the inverse amplitude ratio $$\left(\frac{\eta_T}{\eta_C}\right)^{-1}.$$

In an embodiment, the processor 12 can evaluate thermal boundary conductance to be associated with the inverse amplitude ratio. In this case, thermal boundary conductance corresponding to an inverse amplitude ratio may be stored in advance in a memory and the processor 12 may evaluate the thermal boundary conductance of the interface 22 as a value corresponding to an inverse amplitude ratio.

A process of determining an optimal annealing temperature in accordance with the process of evaluating thermal boundary conductance described above is described.

Referring to FIG. 9, differential reflectivity ΔR/R when graphene 21 was not deposited on GaN (bare GaN), graphene 21 was coupled to GaN by van Der Waals force without annealing (before annealing), and annealing was performed at 200° C. and 400° C. was compared and shown. In the cases, reflectivity can be analyzed to have a certain phase value before reflection (T1) and a different value after reflection (T3) whereas T2 indicates the reflection period of acoustic phonon waves at the interface. During T2, the ascending acoustic phonon, propagating toward the surface, is reversed in the strain polarity from $\eta_T$ to $\eta_c$ at the interface 22, so a phase difference can be clearly revealed when the ascending acoustic phonon $\eta_T$ changes the direction along the opposite-to-interface, dubbed as descending, direction after reflection.

Referring to FIG. 10, a phase difference generated in the period T3 and an amplitude ratio corresponding to the phase difference were observed with the maximum variations when annealing was performed, which means that the thermal conductance of the interface 22 is the highest when annealing was performed at 200° C. Accordingly, a user can maximize the heat dissipation performance of the semiconductor 20 by performing annealing at the temperature of 200° C. when depositing graphene 21 on GaN on the basis of the evaluation described above.

According to the present disclosure, it is possible to perform semiconductor heat treatment that maximizes the heat dissipation performance of a semiconductor by evaluating the thermal conductance of a semiconductor interface on the basis of the phase difference of acoustic phonons produced in the semiconductor.

In detail, since an optimal heat treatment condition for depositing a thermal conductive material and heat dissipation characteristic evaluation is possible by evaluating interface thermal conductance regardless of the type or properties of materials at interfaces between a semiconductor and a heat dissipation material and between semiconductors, and the production process of a semiconductor, there is an effect that it is possible to maximize heat dissipation performance of a semiconductor.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be expected from the configuration should be also admitted.

What is claimed is:

1. An apparatus for evaluating thermal conductance of a semiconductor interface, the apparatus comprising:

a spectrometer exciting acoustic phonons in a semiconductor by irradiating a laser beam to the semiconductor; and a processor evaluating thermal conductance of an interface of the semiconductor in accordance with a phase difference of an ascending acoustic phonon propagating toward the interface and reflecting from the interface and a descending acoustic phonon propagating in an opposite direction to the interface, wherein the processor is configured to calculate the phase difference before and after an acoustic reflection of ascending acoustic phonons based on a reflectivity ΔR/R, which has a relationship to the phase difference in [Equation 1], $$\frac{\Delta R}{R} \sim \sin\left(2nk_{probe}v_{AC}t + \phi_0 + \phi_{C/T}\right) \qquad \text{[Equation 1]}$$

where n is a refractive index of medium at a probe beam wavelength, $k_{probe}$ is a wavenumber of a probe beam, $v_{AC}$ is a velocity of acoustic phonons, t is a time delay, $\phi_0$ is a phase at a production position of an acoustic phonon, and $\phi_{C/T}$ is the phase difference between before and after the acoustic reflection of the ascending acoustic phonons.

2. The apparatus of claim 1, wherein the ascending and descending acoustic phonons propagate in opposite directions to each other from a multiple quantum well in the semiconductor.

3. The apparatus of claim 1, wherein the ascending and descending acoustic phonons propagate perpendicularly to the interface.

4. The apparatus of claim 1, wherein the spectrometer emits the laser beam perpendicularly to the interface.

5. The apparatus of claim 1, wherein the spectrometer excites the ascending and descending acoustic phonons by irradiating a pump beam to the semiconductor and receives interfered probe beams reflected from the ascending and descending acoustic phonons, respectively, by irradiating a probe beam to the semiconductor; and the processor calculates a phase difference of the ascending and descending acoustic phonons based on the received probe beams and evaluates thermal conductance in accordance with the phase difference.

6. The apparatus of claim 5, wherein the spectrometer receives the interfered probe beams while adjusting an optical path difference of the pump beam and the probe beam.

7. The apparatus of claim 6, wherein the processor calculates the phase difference based on reflectivity of a probe beam for each time delay according to the optical path difference.

8. The apparatus of claim 1, wherein the processor evaluates the thermal boundary conductance to be associated with the phase difference.

9. The apparatus of claim 1, wherein the processor calculates an amplitude ratio corresponding to the phase difference in accordance with [Equation 2] and evaluates the thermal conductance to be associated with an inverse amplitude ratio, $$\phi_{C/T} = \tan^{-1}\left(\frac{\sin(2nk_{probe}(z_C - z_T))}{\cos(2nk_{probe}(z_C - z_T)) - \frac{\eta_T}{\eta_C}}\right) \qquad \text{[Equation 2]}$$

(where $\phi_{C/T}$ is the phase difference, n is a refractive index of medium at laser wavelength, $k_{probe}$ is a wavenumber of the laser beam, $z_C$ is a position of the ascending acoustic phonon, $z_T$ is a position of the descending acoustic phonon, $\eta_C$ is an amplitude of the ascending acoustic phonon, $\eta_T$ is an amplitude of the descending acoustic phonon, and $$\frac{\eta_T}{\eta_C}$$

is the amplitude ratio).

* * * * *